US009299336B2

(12) United States Patent
Hald (10) Patent No.: US 9,299,336 B2
(45) Date of Patent: Mar. 29, 2016

(54) COMPUTATIONALLY EFFICIENT BROADBAND FILTER-AND-SUM ARRAY FOCUSING

(71) Applicant: BRÜEL & KJÆR SOUND & VIBRATION MEASUREMENT A/S, Nærum (DK)

(72) Inventor: Jørgen Hald, Fredensborg (DK)

(73) Assignee: Brüel & Kjær Sound & Vibration Measurement A/S, Nærum (DK)

( * ) Notice: Subject to any disclaimer, the term of this patent is extended or adjusted under 35 U.S.C. 154(b) by 141 days.

(21) Appl. No.: 14/355,966

(22) PCT Filed: Nov. 2, 2012

(86) PCT No.: PCT/EP2012/071717
§ 371 (c)(1),
(2) Date: May 2, 2014

(87) PCT Pub. No.: WO2013/064628
PCT Pub. Date: May 10, 2013

(65) Prior Publication Data
US 2014/0313859 A1 Oct. 23, 2014

Related U.S. Application Data

(60) Provisional application No. 61/555,597, filed on Nov. 4, 2011.

(30) Foreign Application Priority Data

Nov. 4, 2011 (EP) .................................... 11187871

(51) Int. Cl.
*G10K 11/34* (2006.01)
*G01S 3/808* (2006.01)

(52) U.S. Cl.
CPC ............. *G10K 11/346* (2013.01); *G01S 3/8083* (2013.01)

(58) Field of Classification Search
CPC .................................................. G01S 3/8083
See application file for complete search history.

(56) References Cited

U.S. PATENT DOCUMENTS

| 6,836,243 B2 * | 12/2004 | Kajala | G01S 3/043 367/122 |
| 2004/0013038 A1 * | 1/2004 | Kajala | G01S 3/043 367/119 |
| 2014/0313859 A1 * | 10/2014 | Hald | G01S 3/8083 367/138 |

FOREIGN PATENT DOCUMENTS

| EP | 2774143 A1 * | 9/2014 | ........... G01S 3/8083 |
| GB | 2192061 A | 12/1987 | |

(Continued)

OTHER PUBLICATIONS

Dimitris Theodoropoulos et al: "Multi-Core Platforms for Beamforming and Wave Field Synthesis". IEEE Transactions on Multimedia, IEEE Service Center, Piscataway, NJ. US, vol. 13, No. 2, Apr. 1, 2011, pp. 235-245.

(Continued)

*Primary Examiner* — Daniel Pihulic
(74) *Attorney, Agent, or Firm* — Nixon Peabody LLP (57) ABSTRACT

A method of determining a focused output signal of a sensor array comprising a plurality of sensors, each sensor being operable to output a sensor output signal responsive to a measured quantity, the focused output signal being indicative of a calculated quantity at a focus point; the method comprising: receiving a respective measured sensor output signal from each of the sensors; computing the focused output signal by performing a focusing calculation with respect to the measured sensor signals; wherein the method further comprises determining a subset of mesh points of a set of predetermined mesh points, each mesh point having at least one pre-computed filter parameter associated with it; and wherein computing the focused output signal comprises performing an interpolation with respect to the subset of mesh points so as to obtain an interpolated focused output signal.

17 Claims, 3 Drawing Sheets

(56) References Cited

FOREIGN PATENT DOCUMENTS

| KR | 20140106545 A | * | 9/2014 | ............ | G01S 3/8083 |
| WO | WO 2013064628 A1 | * | 5/2013 | ............ | G01S 3/8083 |

OTHER PUBLICATIONS

Kajala M et al.: "Filter-and-Sum Beamformer with Adjustable Filter Characteristics" 2001 IEEE International Conference on Acoustics, Speech and Signal Processing, vol. 5, May 7, 2001, pp. 2917-2920, XP010803620.

Park, M., et al. "Sound-field Analysis by Plane-wave Decomposition Using Spherical Microphone Anray". J. Acoust. Soc. Am. 118 (5) Nov. 2005.

Shefeng Yan, et al. "Optimal Modal Beamforming for Spherical Microphone Arrays" IEEE Transactions on Audio, Speech, and Language Processing, vol. 19, No. 2, Feb. 2011, pp. 361-371.

Yan Shefeng et al: Convex optimization based time-domain broadband beamforming with sldelobe control.The Journal of the Acoustical Society of America, American Institute of Physics for the acousticalSociety of America, New York, NY, US, vol. 121, No. 1 May 8, 2007, pp. 46-49.

* cited by examiner

COMPUTATIONALLY EFFICIENT BROADBAND FILTER-AND-SUM ARRAY FOCUSING

CROSS-REFERENCE TO RELATED APPLICATIONS

This application is a U.S. National Stage of International Application No. PCT/EP2012/071717, filed Nov. 2, 2012, which claims the benefit of European Patent Application No. 11187871.6, filed Nov. 4, 2011, and of U.S. Provisional Patent Application No. 61/555,597, filed Nov. 4, 2011, all of which are incorporated herein by reference in their entireties.

TECHNICAL FIELD

The present invention relates to Array signal processing, such as broadband beamforming of e.g. acoustic signals.

BACKGROUND

Broadband beamforming is a widely used technique for directionally receiving signals such as acoustic or radio waves. Beamforming techniques have been described in the context of e.g. sound source localisation, sonar, radar, wireless communication etc. Generally, in such systems, the signals from the sensors are amplified and delayed in such a manner that the resulting measurement system is particularly sensitive to waves coming from a certain direction. In such a measurement system it is possible to steer the sensitivity of an array of sensors to a certain direction—a process known as 'beamforming'. When all channels are recorded simultaneously such a system requires only a very small amount of time for a single measurement.

For example, many noise abatement problems involve localizing one or several sources of noise in a complex environment such as the interior of a car or an aircraft. In recent years it has become possible to perform measurements using many channels simultaneously. Today, measurement systems exists with a large number of microphones (e.g. 64 or 128) mounted in a grid. In other measurement systems the microphones are typically mounted in a less regular configuration.

Due to the cost of microphones (or other sensors) and data/signal acquisition hardware, it is generally desirable to use as few sensors as possible in a beamforming system. On the other hand requirements to the frequency range and to the spatial precision of the system both tend to increase the number of sensors needed in the array.

In the so-called Filter-And-Sum (FAS) beamforming, an output time signal at a given position is computed by applying individual filters to the sensor signals followed by an addition of the filtered signals. The article "Convex optimization based time-domain broadband beamforming with sidelobe control" by Shefeng Yan et al. (J. Acoust. Soc. Am. 121 (1), January 2007) describes an approach based on FIR filters and a method for optimizing the FIR filters for e.g. minimum sidelobe level of the beamformer.

The optimized broadband Filter-And-Sum (FAS) beamforming is able to significantly reduce the side-lobe level relative to Delay-And-Sum (DAS) beamforming and—for the case of spherical arrays—Spherical Harmonics Beamforming (SHB), see for example Shefeng Yan et al. (ibid.) and the article "Optimal Modal Beamforming for Spherical Microphone Arrays" by Shefeng Yan et al. (IEEE Transactions on Audio, Speech and Language Processing, Vol. 19, No. 2, February 2011, 361-371).

However, the computation of the optimal filter parameters is a very heavy computational task as illustrated herein. In particular, in applications where beamforming operations are to be performed for many focus points and for large sensor arrays, the computational resources for performing prior art optimised broadband FAS beamforming may be prohibitive. Also, the method outlined by Shefeng Yan et al. (J. Acoust. Soc. Am, ibid) requires the optimization to be based on a covariance matrix of the signals from each particular measurement, introducing properties similar to those of Minimum Variance (or Capon) beamformers: The output is not a linear function of the sources in the sense that the output resulting from a measurement on two sources is not the sum of the outputs from measurements on each one of the two sources separately.

SUMMARY

Disclosed herein is a method of determining a focused output signal of a sensor array comprising a plurality of sensors, each sensor being operable to output a sensor output signal responsive to a measured quantity, the focused output signal being indicative of a calculated quantity at a focus point.

Embodiments of the method comprise:
  receiving a respective measured sensor output signal from each of the sensors;
  computing the focused output signal by performing a focusing calculation with respect to the measured sensor signals.

The focused output signal may thus be regarded as being indicative of a combination, e.g. a sum or other linear combination, of a plurality of filtered sensor signals computed for respective ones of the sensors; each of the filtered sensor signals may thus be indicative of the measured sensor signal from a respective sensor, filtered by a filter associated with the corresponding sensor from which the measured sensor signal has been received, the filter being dependent on at least one filter parameter dependent on the focus point.

The inventors have realised that the benefits of beamforming and other array focusing techniques, such as acoustic holography, with optimised filters may be obtained with considerably lower computational resources by defining a mesh of focus points that spans the region in space in which focusing calculations are to be performed with a particular array. The thus defined points will also be referred to as mesh points. For each one of these pre-defined mesh points a set of optimised filter parameters are computed and the pre-computed filter parameters may be stored in a filter bank, e.g. a file, a set of files or a database, that is associated with the sensor array. For example, such a filter bank may be provided on a suitable storage medium together with the array. When a measurement has been taken, and a focusing calculation is to be performed at an arbitrary focus point r, then a subset of the pre-defined mesh points is identified, e.g. as the surrounding nearest mesh points, and an interpolation is performed with respect to the selected subset of mesh points. In some embodiments, for each one of these mesh points a focusing calculation is performed, and the focused output at the focus point is approximated by an interpolation between the focused output values from the surrounding mesh points. In alternative embodiments the pre-computed filter parameters of the identified subset of mesh points are interpolated and the focusing calculation is performed using the resulting interpolated filter parameter. Hence, the order of the interpolation step and some or all of the focusing calculation steps may be interchanged.

Accordingly, embodiments of the method disclosed herein further comprise: determining a subset of mesh points of a set of predetermined mesh points, each mesh point having at least one pre-computed filter parameter associated with it; and computing the focused output signal for an arbitrary focus point comprises performing an interpolation with respect to the subset of mesh points so as to obtain an interpolated focused output signal. In particular, computing the focused output signal as an interpolated focused output signal may comprise applying one or more auxiliary filters to each of the respective measured sensor output signals; each of the one or more auxiliary filters being associated with the corresponding sensor from which the respective measured sensor signal has been received, and each of the one or more auxiliary filters being dependent on at least a respective one of the pre-computed filter parameters. Accordingly, each mesh point may have at least one pre-computed filter parameter for each sensor associated with it, i.e. each mesh point may have associated with it a plurality of pre-computed filter parameters, each pre-computed filter parameter being associated with one of the sensors.

Embodiments of the method described herein may be applied to different types of array focusing applications such as beamforming and acoustic holography, or similar applications where contributions from different sensor locations at a desired focus point are to be calculated. In the context of beamforming, the focused output signal may be referred to as beamformed output signal; it may represent the contribution of a sound source at the focus point to the measured quantity (e.g. sound pressure) at the location of the sensor array, e.g. at a centre of the sensor array. In such embodiments, the focusing calculation is thus a beamforming calculation.

In the context of acoustic holography, the focused output signal is indicative of (an estimate of) a quantity (e.g. sound pressure, particle velocity or a different acoustic quantity) at the focus point. In this context the output signals for different focus points may be used to reconstruct (or "back-propagate") an acoustic field in a desired area, e.g. the surface or volume of an object.

Hence, in some embodiments, the focusing calculation is a beamforming calculation; and the focusing calculation comprises determining an estimate of a contribution from a focus point to an acoustic quantity (e.g. sound pressure) at an array position of the sensor array. In alternative embodiments the focusing calculation comprises determining an estimate of a parameter of an acoustic field at the focus point. Hence, in such embodiments, the focused output signal is indicative of a reconstructed acoustic quantity. Generally, the focusing calculation comprises computing a physical quantity at a focus point based on measured sensor signals from sensors of a sensor array. In some embodiments the focusing calculation is a filter-and-sum calculation comprising applying a filter to obtain filtered signals, and a summation (or other linear combination) to obtain the resulting focused signal. Hence, in some embodiments, the term array focusing is intended to refer to a process for estimating a quantity at a focus point via a Filter-And-Sum operation. Accordingly, in some embodiments, the term focusing calculation refers to a filter-and-sum calculation and the focused output signal refers to the result of the filter-and-sum calculation. A filter-and-sum calculation comprises applying respective filters to the sensor signals from respective sensors, and summing the filtered signals.

In some embodiments, computing the focused output signal comprises:
for each sensor, computing a plurality of auxiliary filtered sensor signals by applying respective auxiliary filters to the measured sensor output signal, each auxiliary filter being associated with the corresponding sensor from which the measured sensor signal has been received, and each auxiliary filter being dependent on at least one of the pre-computed filter parameters; each auxiliary filter is thus associated with one of the subset of mesh points;
combining, for each mesh point, the plurality of auxiliary filtered sensor signals computed for respective sensors to obtain an auxiliary focused output signal, and interpolating the auxiliary focused output signals computed for respective mesh points to obtain said interpolated focused output signal.

In some embodiments, computing the focused output signal comprises:
for each sensor, computing a plurality of auxiliary filtered sensor signals by applying respective auxiliary filters to the measured sensor output signal, each auxiliary filter being associated with the corresponding sensor from which the measured sensor signal has been received, and each auxiliary filter being dependent on at least one of the pre-computed filter parameters; again, each auxiliary filter is associated with one of the subset of mesh points;
interpolating, for each sensor, the plurality of auxiliary filtered sensor signals computed for respective mesh points to obtain an interpolated filtered sensor signal, and combining the interpolated sensor signals computed for respective sensors to obtain said interpolated focused output signal.

In yet other embodiments, computing the focused output signal comprises:
computing, for each sensor, at least one interpolated filter parameter from said pre-computed filter parameters associated with respective ones of the determined subset of mesh points;
computing, for each sensor, an interpolated filtered sensor signal by applying the respective interpolated filter to the measured sensor output signal; and
combining the interpolated filtered sensor signals computed for respective sensors to obtain the interpolated focused output signal.

It will be appreciated that the focusing operation and/or the interpolation operation may be performed in different domains, e.g. the time domain and/or in the frequency domain.

In the far-field region relative to the applied array, a beamformer will have no distance (depth) resolution, so only a directional discrimination of sources can be obtained. At intermediate distances some degree of distance resolution can be achieved, so here focusing at specific points in 3D may be desirable, for example to obtain a 3D source distribution map. Embodiments of the method described herein use pre-calculated filters for a mesh of focus points. If a beamformer is intended to be used only in the far-field region, then only a directional (a 2D) mesh is needed, and focusing will be directional. Otherwise a 3D mesh may be needed, and focusing will be at specific points. Similar considerations apply to acoustic holography. Nevertheless, for the purpose of the present description, the terms directional focusing and point focusing will be used interchangeably, and focus directions will be represented also by position vectors in the relevant directions. Accordingly, the terms mesh point and focus point as used herein are intended to comprise a position in 3D space as well as a direction in 3D space, e.g. as represented by a position on a unit sphere. Each mesh point and each focus point may thus be definable by three spatial coordinates relative to a suitable coordinate system or by two spatial coordinates defining a position on a two-dimensional surface (e.g. a sphere) in 3D space.

The sensor output signal may be an acoustic signal i.e. indicative of a measured sound, e.g. noise, audible sound, inaudible sound such as ultra-sound or infra-sound, etc., or a combination thereof. In other embodiments, the sensor output signal may be indicative of any other acoustic or radio signal, e.g. a sonar signal, a radar signal, a wireless communication signal or the like.

The measured quantity may be an acoustic quantity, e.g. a sound pressure, a sound pressure gradient, a particle velocity, and/or the like. Accordingly each sensor may be any suitable acoustic measuring device, e.g. a microphone, a hydrophone, a pressure gradient transducer, a particle velocity transducer, receivers/transducers for wireless communications systems, radar and/or sonar, etc. or a combination thereof. The sensor array comprises a plurality of sensors, e.g. a set of sensors arranged in a regular or irregular grid, for example, a two- or three-dimensional grid.

The sensors of the arrays may be arranged at respective ones of a set of measurement locations. The set of measurement locations may be arranged in one or more measurement planes, e.g. in a single plane or in two or more parallel planes. Within each plane, the measurement locations may be arranged on a regular grid, in an irregular pattern, or in any other suitable way. Furthermore, the method described herein may also be applied to non-planar measurement geometries, i.e. arrangements where the measurement locations are not located in one or more parallel planes, but e.g. on a curved surface. For example, the method described herein may be applied to a spherical array geometry.

The term interpolation is intended to refer to any suitable process for at least approximately computing a new data point within a proximity of a discrete set of known data points. In the context of the present description the term interpolation is intended to refer to the computation of a focused output signal associated with a focus point from known filter parameters, each filter parameter being associated with one of a discrete (sub-)set a of mesh points, where the focus point is within a predetermined proximity of the mesh points. Hence, selecting the subset of mesh points may comprise selecting mesh points in a proximity of the focus point, e.g. selecting all mesh points in a predetermined proximity of the focus point, or selecting a predetermined number of mesh points nearest the focus point. However, it will be appreciated that other mechanisms for selecting the subset of mesh points to be used for performing the interpolation may be chosen.

The interpolation may be a piecewise constant interpolation, a linear interpolation, a polynomial interpolation, a spline interpolation, or any other suitable interpolation method. The interpolation may be in angle and/or in linear coordinates (1D, 2D or 3D). It will further be appreciated that, in some embodiments, the order of the interpolation and combination operations may be interchanged. In particular, this applies to embodiments where the interpolation is a linear combination of values computed at each mesh point, and where the combination of the plurality of filtered sensor signals that results in the focused output signal is a linear combination of the computed filtered sensor signals, e.g. a sum of the computed filtered sensor signals.

In some embodiments, auxiliary filtered signals for each of the mesh points to be used for the interpolation (and for each sensor) may be computed by applying the respective pre-computed filter parameters associated with the respective mesh points. Subsequently, for each sensor, the filtered sensor signal needed for the chosen focus point may be computed as an interpolation of the computed auxiliary filtered sensor signals. Alternatively, for each mesh point, an auxiliary focused output signal may be computed from the auxiliary filtered sensor signals for that mesh point and for respective sensors, and the auxiliary focused output signals for the respective mesh points may then be interpolated to obtain the interpolated focused output signal. Hence, the summing over (or otherwise combining of) the auxiliary filtered sensor signals for the respective sensors and the interpolation over different mesh points may be performed in any order, in particular when the interpolation is computed as a linear combination of the computed values associated with the respective mesh points. In embodiments where focusing (e.g. beamforming) with respect to multiple focus points is to be carried out, e.g. for obtaining a beamforming map or a reconstructed acoustic field map, the process may further be speeded up in the following way: First, the focusing calculation may be performed across at least the subset of the mesh points required for interpolation at all focus points involved in obtaining the beamforming or reconstructed map, i.e. by applying the respective pre-computed filter parameters associated with each of said subset of mesh points so as to compute respective auxiliary filtered signals, each associated with one of the mesh points and with one of the sensors. For each mesh point, a number of respective auxiliary filtered signals are computed, at least one for each sensor. The filtered sensor signals for each of the desired focus points may then be computed by interpolation of respective ones of the computed auxiliary filtered signals. Alternatively, the interpolated focused output signal for each of the desired focus points may be computed by interpolating respective focused output signals computed from the respective auxiliary filtered signals.

When the filtered sensor output signal is (at least approximately) a linear function of the filter parameters, as is e.g. the case for FIR filters, the filtered sensor output signals associated with a desired focus point may be calculated by first computing interpolated filter parameters from pre-computed filter parameters associated to respective ones of the mesh points, the interpolated filter parameters defining an interpolated filter, and then calculating the filtered sensor output by applying the interpolated filter to the sensor output signals. The interpolated focused output signal may then be computed by combining the filtered sensor outputs from respective sensors. In this embodiment, the number of focusing calculations will in some cases be reduced, thus reducing the computational cost of the array focusing (e.g. beamforming) operation.

Each mesh point may have associated with it at least one pre-computed filter parameter for each sensor. The pre-computed filter parameters may be computed, for a given mesh point, by minimising the power of the focused output signal while requiring contributions from the mesh point to be completely retained in the output signal.

In some embodiments, each set of pre-computed filter parameter(s) associated with a first mesh point may be computed by minimising a maximum sidelobe level, the maximum sidelobe level being indicative of a level of suppression of disturbances from a set of other positions different from the first mesh point and at a set of predetermined frequencies. It has been realised that this embodiment reduces the risk of high sidelobe sensitivity peaks at some positions of disturbing sources and at some frequencies.

Generally, each mesh point may have a set of pre-computed filter parameters associated with it.

In some embodiments, each pre-computed filter parameter set associated with a first mesh point is computed by determining, for each of a set of predetermined frequencies, a set of complex sensor weights by minimising a maximum sidelobe level, the maximum sidelobe level being indicative of a level of suppression of disturbances from a set of other positions different from the first mesh point and at said frequency, each sensor weight being associated with a respective one of the sensors;

determining, for each sensor, at least one pre-computed filter parameter by fitting a frequency response defined/established by said pre-computed filter parameter(s) to a frequency response vector composed of a subset of said determined sensor weights, the sensor weights of said subset being associated with respective frequencies for the particular sensor. It has turned out that this embodiment considerably reduces the required computational resources for computing the pre-computed filter parameters while allowing very different levels of sidelobe suppression to be achieved at different frequencies.

The mesh points may be selected as any suitable regular or irregular grid of points, e.g. a two-dimensional or a three-dimensional grid. The mesh points may be arranged in one or more planes, e.g. in a single plane or in two or more parallel planes. Within each plane, the mesh points may be arranged on a regular grid, in an irregular pattern, or in any other suitable way. Alternatively, the mesh points may be distributed within one or more curved surfaces, e.g. one or more spheres having respective radii. In some embodiments, the mesh points are arranged with a distance between neighbouring mesh points smaller than a local beamwidth of the beamformer used.

It is noted that features of the method described above and in the following may be implemented at least in part in software or firmware and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

Embodiments of the present invention can be implemented in different ways, including the method described above and in the following, systems, devices and product means, each yielding one or more of the benefits and advantages described in connection with the first-mentioned method, and each having one or more embodiments corresponding to the embodiments described in connection with the first-mentioned method and/or as disclosed in the dependent claims.

In particular, embodiments of a processing apparatus for performing array focusing (e.g. beamforming) calculations may comprise an interface for receiving, from respective sensors of a sensor array, a set of sensor output signals responsive to a measured quantity; and a processing unit configured to perform the steps of an embodiment of the method defined herein, wherein the processing unit comprises a storage medium for storing said set of pre-computed filter parameters.

An array focusing (e.g. beamformer or holography) system may comprise a processing apparatus as defined above and in the following, and a set of sensors for measuring a measured quantity at a set of measurement locations, and connectable in communication connection to the apparatus so as to forward the measured first acoustic quantity to the processing apparatus. For example, such a system may be used for localising sound (e.g. noise) sources in 3D space, e.g. for localising sound sources in an enclosure.

It will be appreciated that the pre-computed filter parameters may be generated by a computer program that may be separate from or included in a computer program for performing the array focusing (e.g. beamforming) process (e.g. as part of the computer program or in a separate file or files), or as a combination thereof. For example, the pre-computed filter parameters may be generated by the computer program or an installation program and stored in a database or other storage media to be delivered with a sensor array.

A computer program may comprise program code means adapted to cause a data processing system to perform the steps of the method disclosed above and in the following when the program code means are executed on the data processing system. The computer program may be stored on a computer-readable storage medium or embodied as a data signal. The storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

A computer-readable storage medium may have stored thereon a set of pre-computed filter parameters each associated with one of a set of mesh points and each for use by a processing apparatus as defined herein when performing the steps of an embodiment of the method disclosed herein.

According to another general aspect, disclosed herein is a method of determining a focused output signal of a sensor array comprising a plurality of sensors, each sensor being operable to output a sensor output signal responsive to a measured quantity, the focused output signal being indicative of a calculated quantity at a focus point. Embodiments of the method comprise:

receiving a respective measured sensor output signal from each of the sensors;

computing a respective filtered sensor signal from each of the received measured sensor output signals, the filtered sensor signal being indicative of the measured sensor signal filtered by a filter associated with the corresponding sensor from which the measured sensor signal has been received, the filter being dependent on at least one filter parameter dependent on the focus point;

combining a plurality of computed filtered sensor signals to obtain the focused output signal.

BRIEF DESCRIPTION OF THE DRAWINGS

The above and other aspects will be apparent and elucidated from the embodiments described in the following with reference to the drawing in which.

Throughout the drawings, equal reference signs refer to equal or corresponding elements, features, or components, wherever feasible.

DETAILED DESCRIPTION

In the following, aspects and embodiments of the present invention will be described in more detail with reference to a beamforming system. It will be appreciated however, that embodiments of the method, products and systems described herein may also be applied to acoustic holography.

Figure 1:
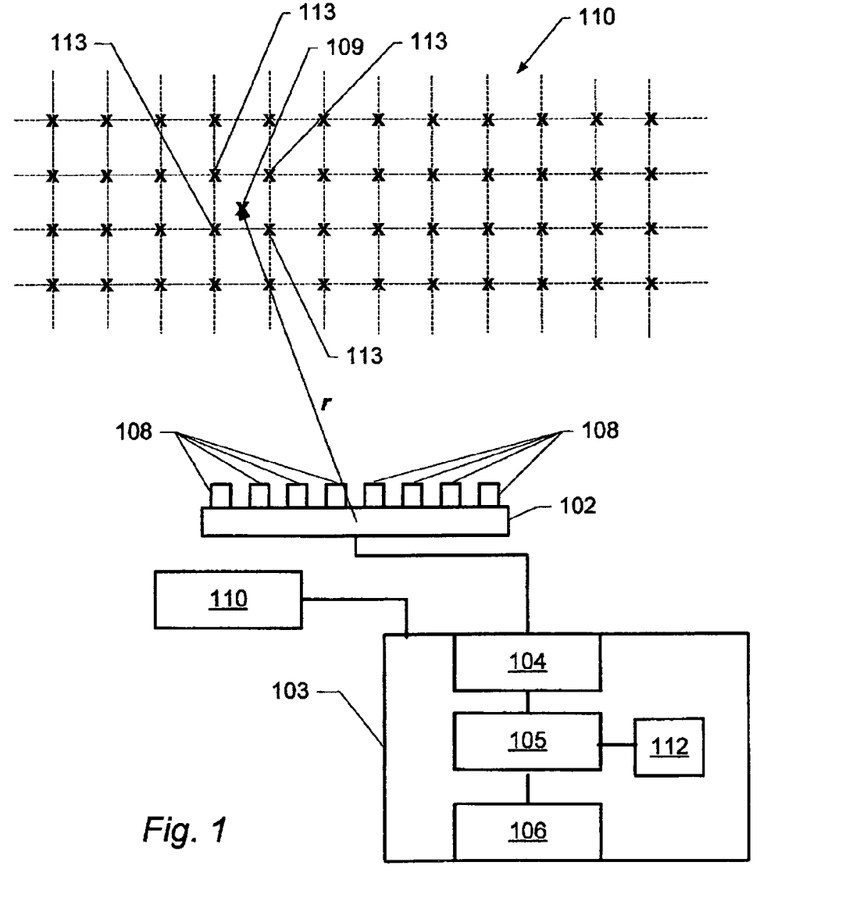
FIG. 1 shows a schematic block diagram of a beamformer system.

FIG. 1 shows a schematic block diagram of a beamformer system for performing beamforming of acoustic waves. The system comprises a set of acoustic receivers 108 and an analysing unit 103 connected to the acoustic receivers.

In the following the acoustic receivers 108 will also be referred to as transducers. Nevertheless, it will be appreciated that the acoustic receivers may be microphones, hydrophones or any other suitable sensor for measuring an acoustic property such as sound pressure, sound pressure gradient, particle velocity, or other linear quantities. In the embodiment of FIG. 1, the transducers 108 are implemented as an array 102 of transducers where the transducers 108 are arranged in a regular grid, e.g. a 1-, 2-, or 3-dimensional grid. The transducers may be arranged on a regular grid or an irregular geometry. In beamforming applications, irregular geometries perform better and are therefore typically used. The number of transducers and the geometry of the array, e.g. the inter-transducer spacing, may be chosen in accordance with the size and geometry of the enclosure within which sound sources are to be localised, the frequency range of interest, the desired spatial resolution, and/or other design parameters.

The transducer array 102 is connected to the analysing unit 103 such that the transducers 108 can forward the measured signals to the analysing unit, e.g. via a wired or wireless signal connection. The signals measured by the transducers will also be referred to as sensor signals.

The analysing unit 103 includes interface circuitry 104 for receiving and processing the measured signals from the transducer array 102, a processing unit 105 in data communication with the interface circuit 104, a storage medium 112, and an output unit 106 in data communication with the processing unit 105. Even though shown as a single unit in FIG. 1, it will be appreciated that the analysing unit 103 can be physically divided in two separate devices, e.g. an acquisition front-end and a computer, or even more than two devices. Similarly, it will be appreciated that the functions described in relation to the different sub-blocks of the analysing unit may be divided into alternative or additional functional or hardware units/modules.

The interface circuit comprises signal processing circuitry suitable for receiving the output signals from the transducers 108 and for processing the received signals for subsequent analysis by the processing unit 105. The interface unit performs a simultaneous time data acquisition, and all further processing may then be done by the processing unit 105, including transform of data to frequency domain, typically using FFT. The interface circuit 104 may comprise one or more of the following components: one or more pre-amplifiers for amplifying the received signals, one or more analogue-to-digital (ND) converters for converting the received signal into a digital signal, one or more filters, e.g. bandwidth filters, and/or the like. For example, the interface circuit may provide as output data the amplitude and phase as a function of frequency for each of the transducers.

The processing unit 105 may be a suitably programmed microprocessor, a central processing unit of a computer, or any other suitable device for processing the signals received from the interface unit 104, e.g. an ASIC, a DSP, a GPU, and/or the like. The processing unit is adapted to process the sensor signals received via the interface circuit 104 so as to compute a beamformed output signal as described herein.

The storage medium 112 may comprise any suitable circuitry or device for storing data indicative of a set of pre-computer filter parameters, such as a RAM, a ROM, an EPROM, EEPROM, flash memory, magnetic or optical storage device, such as a CD ROM, a DVD, a hard disk, and/or the like. In FIG. 1, the storage medium is shown separate but in communication connection with the processing unit. It will be appreciated, however, that the storage medium 112 may also be embodied as a part of the processing unit 105, e.g. as an internal memory.

The output unit 106 may comprise a display or any other suitable device or circuitry for providing a visual representation of the beamformed signal, e.g. a map of beamformed output signals in respect of different focus points. Examples of a suitable output unit include a printer and/or printer interface for providing a printed representation. Alternatively or additionally, the output unit 106 may comprise any suitable circuitry or device for communicating and/or storing data indicative of the beamformed output signal, such as a RAM, a ROM, an EPROM, EEPROM, flash memory, magnetic or optical storage device, such as a CD ROM, a DVD, a hard disk, a wired or wireless data communications interface, e.g. an interface to a computer or telecommunications network, such as a LAN, a wide area network, and internet, and/or the like.

The analysing unit 103 may be implemented as a suitably programmed computer, e.g. a PC including a suitable signal acquisition board or circuit.

During operation, the transducer array 102 may be positioned at a location in the surrounding of which a sound source is to be located or where the location of sound sources is to be mapped out, e.g. near a surface of an object including a sound source that emits acoustic radiation or inside an enclosure. The number of transducers, the geometry of the array, e.g. the inter-transducer spacing, and the distance to possible sound sources may be chosen in accordance with the size and geometric complexity of the object or environment to be analysed, the frequency range of interest, and the desired spatial resolution.

The position of the array 102 may be determined, e.g. by a position detection device, and fed into the analysing unit 103. The transducers 108 of the array 102 may measure sound pressure or another suitable acoustic quantity at their respective positions, and the resulting sensor signals are sent to the analysing unit 103.

For example, the transducer array may be a hand-held array with integrated position detection device, thus allowing measurements at different accessible positions distributed around an object. Another typical application may be inside a car cabin, where a 3D array grid may be used to be able to distinguish sources in all directions, e.g. a spherical array or a dual layer array (e.g. including 8×8×2 sensors) may be used.

The analysing unit 103 computes a beamformed output signal in respect of one or more focus points 109 and/or directions from the signals measured by the transducers. The analysing unit may store and/or output a representation of the beamformed signal, e.g. a map of sound intensities or contributions to the sound pressure at the array position as a function of direction and/or focal point.

Figure 2:
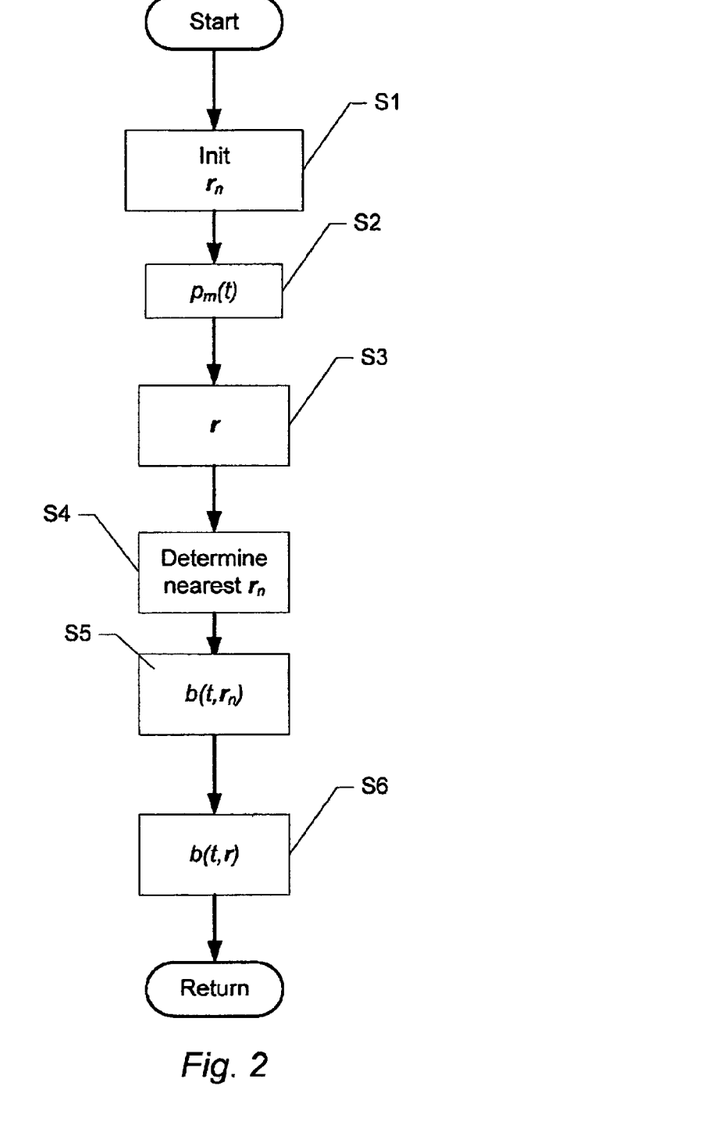
FIG. 2 shows a flow diagram of a process of computing a beamformed output signal of a sensor array.

An embodiment of a process for computing a beamformed output signal will be described with reference to FIG. 2 and continued reference to FIG. 1.

Generally, embodiments of the process may calculate the output time signal b(t,r) at a given position/direction r. For example, the output signal may be an estimate of the contribution from the focus point/direction to the sound pressure at (the centre of) the sensor array. As mentioned above, r may define a position or a direction in 3D (e.g. as represented by a position on a unit sphere around the centre of the sensor array or another suitable origin of a coordinate system). A FAS beamformer may first apply individual filters h to the sensor signals $p_m(t)$, m=1, 2, ..., M, to obtain filtered sensor signals, followed by an addition of the filtered signals:

$$b(t, r) = \sum_m p_m(t) \otimes h(t, \alpha_m(r)) \quad (1)$$

Here, the symbol $\otimes$ represents convolution in time, and the vector $\alpha_m(r)$ contains the parameters of the filter applied to transducer number m in order to help focusing the beamformer at position r. Hence, the beamformed output signal b(t,r) is obtained by combining, in this embodiment summing, a plurality of computed filtered sensor signals. Generally, it will be appreciated that the beamformed output signal may be calculated by a different combination, in particular linear combination, of the computed filtered sensor signals. The filters may be FIR filters; however embodiments of the process described herein may also be applied with other types of filters. The article S. Yan, C. Hou and X. Ma, "Convex optimization based time-domain broadband beamforming with sidelobe control", J. Acoust. Soc. Am. 121 (1), January 2007, 46-49, describes a FIR-filter-based approach, including a method to optimize the FIR filters for e.g. minimum sidelobe level of the beamformer. The skilled person will appreciate that the computation of the optimal filter parameter vector $\alpha_m(r)$ is in many cases a very heavy computational task, not suited to be solved for every calculation point each time a beamforming calculation must be performed. In the following an example of an efficient method of performing optimised FAS beamforming will be described in more detail.

In an initial step S1, the process defines a suitable coordinate system and obtains a set of N mesh points $r_n$, n=1, 2, ..., N forming a mesh 110 for which pre-computed optimised filter parameters are available. The mesh of the positions $r_n$ spans the region in space in which beamforming calculations are to be performed with the particular array. Generally, the spacing between the points $r_n$ of the mesh should be somewhat smaller than the local beamwidth of the beamformer. The spacing may depend on the interpolation scheme used, and be determined at the point where the entire system (filters, interpolation scheme, mesh generation) is designed. At that point the spacing may be selected sufficiently small so as to obtain the desired accuracy of the interpolation. For each one of these mesh points $r_n$, the process obtains a set of pre-calculated, optimised filter parameter vectors $\alpha_m(r_n)$, where n =1, 2, ..., N is an index associated with the N mesh points and m=1, 2, ..., M is an index associated with the M transducers of the array. The filter parameters $\alpha_m(r_n)$ thus define respective auxiliary filters associated with the respective mesh points. For example, the mesh points and associated filter parameters may be stored in a filter bank (e.g. a file, a set of files or a database) that is associated with the array and which may be provided together with the array. Examples of methods for computing the optimised filter parameters will be described in more detail below. Typically the mesh and the filter parameters are defined/computed once and for all by a special/separate program and delivered together with the sensor array. But it could also be done during installation, or by a suitable initialization function in the beamforming software (thus allowing re-calculation).

In step S2, the process receives a measurement, i.e. a set of sensor signals $p_m(t)$, m=1, 2, ..., M from the respective transducers of the array.

In step S3, the process selects a vector r defining a position or direction in respect of which a beamformed signal is to be calculated. For example, the process may automatically select a sequence of positions, or the process may receive a user input indicative of a desired direction/position, or the user may define a grid of points r as a basis for generating a source distribution map.

In step S4, the process identifies the surrounding nearest mesh points closest to the focus point r. In FIG. 1, the mesh points nearest to point 109 are denoted 113. It will be appreciated that the number of identified mesh points may depend on the interpolation algorithm used, the choice of coordinate system and the type of mesh. For example, if the mesh points are arranged in a cubic grid, the process may determine the surrounding nearest mesh points as the corners of the cube in which the focus point r is located. Similarly, if the mesh points are arranged on one or more spheres centred around an origin of the coordinate system and having respective radii, the process may determine the spheres closest to the position r, and then determine a predetermined number of closest mesh points on each of the spheres.

In step S5, the process performs a beamforming calculation for each of the determined nearest mesh points using the pre-computed filter parameters associated with the respective mesh points:

$$b(t, r_n) = \sum_m p_m(t) \otimes h(t, \alpha_m(r_n))$$

Hence, the beamformer outputs are computed by combining, in this case summing, auxiliary filtered sensor signals resulting from applying auxiliary filters to each of the sensor signals. The auxiliary filters are in turn defined by the pre-computed filter parameters $\alpha_m(r_n)$. In step S6, the process performs an interpolation of the thus calculated beamformer outputs at the positions $r_n$ so as to arrive at an interpolated beamformer output b(t,r) at the position r. The interpolated beamformer output is thus calculated by for each sensor, computing a plurality of auxiliary filtered sensor signals associated with the selected subset of mesh points by applying respective auxiliary filters to the measured sensor output signal, each auxiliary filter being associated with the corresponding sensor from which the measured sensor signal has been received, and each auxiliary filter being dependent on at least one of the pre-computed filter parameters;

combining, for each mesh point, the plurality of auxiliary filtered sensor signals computed for respective sensors to obtain an auxiliary beamformed output signal $b(t,r_n)$, and interpolating the auxiliary beamformed output signals computed for respective mesh points to obtain said interpolated beamformed output signal.

The interpolation may be performed using any suitable interpolation technique known as such. A simple form of interpolation is a linear interpolation in angle or in linear coordinates (1D, 2D or 3D).

The beamforming process can be speeded up in the following ways:
1) Beamforming calculation may first be performed across at least that part of the mesh points that are required for interpolation at all calculation points r involved in obtaining a specified beamforming map. The interpolation is then performed in a second step.
2) For the case of FIR filters, the beamformer output of eqn. (1) is a linear function of the filter coefficients $h_m(r_n)$ (which constitute now a major part of the parameter vector $\alpha_m(r_n)$):

$$b(t, r_n) = \sum_{m} \sum_{l=0}^{L-1} p_m(t - (l + v_m) \cdot T_{SF}) \cdot h_{m,l}(r_n). \quad (2)$$

where, $T_{SF}$ is the sampling time interval of the FIR filters, L is the number of tabs in the filters, $v_m$ is a shared integer sample-interval delay between transducer m and all mesh points $r_n$, and $h_{m,l}(r_n)$ constitute, for a given n and m, the L elements of the filter coefficient vector $h_m(r_n)$. Instead of doing the spatial interpolation on the mesh point beamformer output signals $b(t,r_n)$ to get $b(t,r)$, the FIR filter coefficients $h_{m,l}(r_n)$ can be interpolated to get $h_{m,l}(r)$, which can be then applied in equation (2). Hence, the beamformed output signal may be calculated by:

computing, for each sensor, at least one interpolated filter parameter $h_{m,l}(r)$ from pre-computed filter parameters $h_{m,l}(r_n)$ associated with respective ones of the determined subset of mesh points;

computing, for each sensor, an interpolated filtered sensor signal by applying the respective interpolated filter to the measured sensor output signal; and combining the interpolated filtered sensor signals computed for respective sensors to obtain the interpolated beamformed output signal.

The shared delay counts $v_m$ in equation (2) are introduced in order to minimize the required FIR filter length: Assuming a similarity with DAS beamforming, the delay that would be needed in DAS is approximated with $v_m$, so the FIR filter needs to model a delay of maximum a few sample intervals plus a deviation from a pure delay introduced by the filter optimization. If the delay offset counts $v_m$ are not known by the FAS beamforming software, they are stored in the filter bank (i.e. in $\alpha_m(r_n)$) together with the vectors $h_m(r_n)$ of FIR filter coefficients.

Calculating the beamformer output signal of equation (2) with the same sampling rate as the sensor signals causes the formula to be a sum over the transducers of discrete convolutions:

$$b(\kappa T_{SF}, r_n) = \sum_{m} \sum_{l=0}^{L-1} p_m((\kappa - l - v_m) \cdot T_{SF}) \cdot h_{m,l}(r_n), \quad (3)$$

$\kappa$ being an integer sample count on the output. The practical calculation of the convolution can be done efficiently using for example the standard Overlap-Add algorithm, which utilizes FFT.

A frequency domain formulation can be obtained through a Fourier transform of equation (2):

$$B(\omega, r_n) = \sum_{m} P_m(\omega) e^{-j\omega v_m T_{SF}} \sum_{l=0}^{L-1} h_{m,l}(r_n) e^{-j\omega l T_{SF}}, \quad (4)$$

$P_m(\omega)$ being the transducer sound pressure spectrum and $\omega$ the angular frequency. Introduction of the frequency domain representation $H_m(\omega, r_r)$ of the filters:

$$H_m(\omega, r_n) \equiv \sum_{l=0}^{L-1} h_{m,l}(r_n) e^{-j\omega l T_{SF}} \quad (5)$$

allows the frequency domain beamforming expression (4) to be written as:

$$B(\omega, r_n) = \sum_{m} P_m(\omega) H_m(\omega, r_n) e^{-j\omega v_m T_{SF}}. \quad (6)$$

Considering, for simplicity of the present description, only Radix 2 FFT processing, the frequency domain filters $H_m(\omega, r_n)$ of equation (5) can be computed using FFT, if the sampling time interval of the sensor signals $T_S$ equals $2^\mu T_{SF}$ for some non-negative integer $\mu$. With record length K of the sensor signals, the frequencies $\omega_k = 2\pi f_k$ in the FFT spectra of the sensor signals will be $f_k = k/(KT_S)$, $k = 0, 1, 2, \ldots, K/2$, and equation (5) becomes:

$$H_m(\omega_k, r_n) \equiv \sum_{l=0}^{L-1} h_{m,l}(r_n) e^{-j2\pi l k T_{SF}/KT_S} = \sum_{l=0}^{L-1} h_{m,l}(r_n) e^{-j2\pi \frac{lk}{2^\mu K}}, \quad (7)$$

which can be computed for each combination (n,m) by zero-padding the FIR-filter coefficient vector from length L to length $2^\mu K$ followed by FFT. This possibility supports very efficient frequency domain beamforming for most cases where the measured signals have a sampling frequency equal to or less than that used in the FIR filter bank.

An alternative frequency-domain implementation will be illustrated in the following. In particular, in the following, $P_m$ denotes the complex sensor signal (e.g. sound pressure) measured by sensor m at a given frequency, and $H_{m,n}$ denotes the complex frequency-response function (FRF) of the filter applied to the sensor signal from sensor m for focusing the beamformer at mesh point n, Then the beamformed signal $B_n$ at mesh point n at the given frequency is $$B_n = \sum_{m} H_{m,n} P_m$$

Furthermore, when $w_n$ denotes the interpolation weight factor to be applied to the beamformed result $B_n$ at mesh point n so as to obtain the interpolated beamformed signal B at a desired focus point, the interpolated beamformed signal at the given frequency may be obtained as:

$$B = \sum_{n} w_n B_n = \sum_{m} \left[ \sum_{n} w_n H_{m,n} \right] P_m$$

Hence, in order to compute B, one may initially compute the interpolated frequency-responses and subsequently use the interpolated frequency response functions in the beamforming calculation. Hence, in some embodiments, the pre-computed filter parameters associated with each mesh point may be frequency responses for that mesh point associated with the respective sensors and for respective frequencies.

As the frequency-responses typically only will be available at a set of discrete frequencies, an additional interpolation in frequency may be performed so as to compute the beamformed result at an arbitrary frequency.

Optimization of FIR-Filters for Minimum Sidelobe Level:

In the following, alternative methods of pre-computing the optimised filter coefficients $h_m(r_n)$ will be described in more detail in the case of FIR filters and where the optimisation is performed for minimum sidelobe level.

For the purpose of the present description the calculation of a set of optimal FIR-filter coefficients for a single focus point or direction will be described, e.g. one of the mesh points $r_n$. It will be appreciated, that the methods described below may be used to compute filter parameters for all mesh points $r_n$. The computed filter parameters may then be stored and used in a method as described herein.

Figure 3:
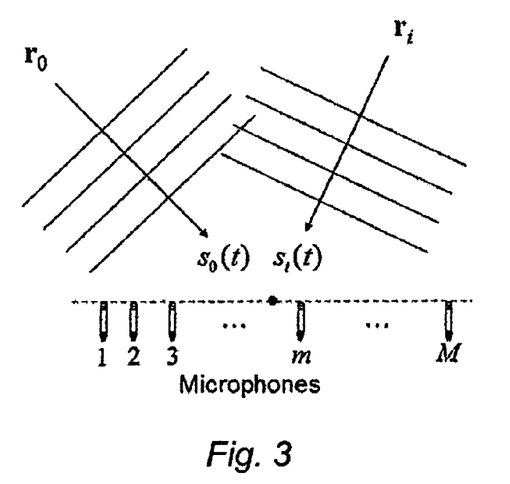
FIG. 3 shows a measurement set-up with microphones in a planar array.

FIG. 3 shows a measurement set-up with M transducers in a planar array. I+1 point sources produce incident waves from positions $r_i$, i=0, 1, 2, ..., I, which are here in the far-field region relative to the array. Using the focusing capabilities of FAS beamforming, the free-field (i.e. with no array in place) sound pressure contribution $s_0(t)$ from source i=0 at a reference position in the array shall be extracted, while suppressing to the largest possible extent contributions, $s_i(t)$, i=1, 2, ... I, from the other "disturbing" sources. The extraction is based on the different origin (position $r_i$) of the sound waves as seen from the array.

Although a planar array in free field is shown in the example of FIG. 3, the principle described in the present section applies for any array geometry and for any array support structure, including flush mounting in a plate or on a rigid spherical surface. Generally, the sensor signals can be expressed mathematically in the following way:

$$p_m(t) = \sum_{i=0}^{I} s_i(t) \otimes g_{i,m}(\tau), \quad (8)$$

with known impulse response functions $g_{i,m}(\tau)$ from the free-field pressure contribution $s_i(t)$ to the actual contributions to the pressure $p_m(t)$ measured by the transducers. For an array of transducers in free field, where the influence of the transducers on the sound field can be neglected, and with sources only in the far-field region, the functions $g_{i,m}(\tau)$ represent just delays, $\tau_{i,m}$, of sound field #i from the reference point to transducer m.

Fourier transform of both sides in Equation (8) leads to the equivalent frequency domain relation:

$$P_m(\omega) = \sum_{i=0}^{I} S_i(\omega) G_{i,m}(\omega), \quad (9)$$

where P, S and G are Fourier transforms of p, s and g, respectively. In the above example where $g_{i,m}(\tau)$ represented a delay, the corresponding function $G_{i,m}(\omega)$ will represent an equivalent phase shift (for an array in free field and sources in far field):

$$G_{i,m}(\omega) = e^{-j\omega \tau_{i,m}} \quad (10)$$

In order to extract the contribution $s_0(t)$ or $S_0(\omega)$ from source #0, we focus the beamformer at the position $r_0$ of that source. Using the frequency domain expression (4) for the beamformer, we skip the index n because only the focus point $r_0$ will be considered. Substitution of the expression (9) for the transducer pressure spectra in equation (4) then leads to:

$$B(\omega) = \sum_{i=0}^{I} B_i(\omega), \quad (11)$$

where $B_i$ is the contribution from source number i:

$$B_i(\omega) \equiv \sum_m S_i(\omega) G_{i,m}(\omega) e^{-j\omega v_m T_{SF}} \sum_{l=0}^{L-1} h_{m,l} e^{-j\omega l T_{SF}} = \quad (12)$$

$$S_i(\omega) \sum_m \sum_{l=0}^{L-1} G_{i,m}(\omega) e^{-j\omega(l+v_m) T_{SF}} h_{m,l} = S_i(\omega) u^T(\omega, r_i) h,$$

the column vectors u and h being defined as follows:

$$u(\omega, r_i) \equiv \{G_{i,m}(\omega) e^{-j\omega(l+v_m) T_{SF}}\}_{\substack{m=1,2,\ldots,M \\ l=0,1,\ldots,L-1}} \quad (13)$$

$$h \equiv \{h_{m,l}\}_{\substack{m=1,2,\ldots,M \\ l=0,1,\ldots,L-1}},$$

with elements identically organized and T representing transpose of a vector or matrix. Ideally we would like to find a filter vector h such that $B_0(\omega) = S_0(\omega)$ and $B_i(\omega) = 0$, i=1, 2, ..., I across the frequency range of interest, which according to equation (12) is equivalent to $u^T(\omega, r_0)h=1$ and $u^T(\omega, r_i)h=0$, i=1, 2, ..., I.

The first embodiment of a method for pre-computing optimised filter parameters to be described is similar to the one described by S. Yan, C. Hou and X. Ma (ibid.). In that method, a relatively small number I of disturbing sources to be suppressed is considered. So contributions from these relatively few assumed positions of disturbing sources will be minimized. Disturbances from other positions (directions) are minimized in an average sense by minimizing the power of the beamformer output signal while requiring contributions from the focus point $r_0$ to be completely retained in the output signal.

To minimize the output power it is shown by S. Yan, C. Hou and X. Ma (ibid.) that this output power equals $h^T R h^*$, where R is the co-variance matrix of the sensor signals, h is the vector of FIR filter coefficients to be determined, and * represents complex conjugate. Introducing the Cholesky factorization $R=U^H U$ of R, where H represents conjugate (Hermitian) transpose, the output power can be expressed as $\|U^* h\|_2^2$, which can be minimized by minimizing $\|U^* h\|_2$.

With reference to equation (12) the method can now be described mathematically as follows:

$$\underset{h,\gamma}{\text{Minimize }} \gamma \quad (14)$$

subject to $$\|U * h\|_2 \leq \gamma$$

$$|u^T(\omega_k, r_0) h| = 1,$$

$$k = 1, 2, \ldots, K$$

$$|u^T(\omega_k, r_{k,i}) h| \leq \varepsilon,$$

-continued $$k = 1, 2, \ldots, K,$$

$$i = 1, 2, \ldots, I_k$$

$$\|h\| \leq \Delta$$

Here, $\epsilon$ is a constant that defines the required level of suppression of the disturbance from the selected I positions, $\omega_k$ are a set of frequencies where the constraints are imposed, $r_{k,i}$ represents a possibly frequency-varying set of points where disturbing sources should be suppressed, and $\Delta$ defines the maximum of a norm (usually 2-norm) of the FIR coefficient vector h, limiting thereby the so-called White Noise Gain (WNG) of the beamformer (see S. Yan, C. Hou and X. Ma (ibid.)). One reason for using a frequency dependent set of points, $r_{k,i}$, is that the beam-width will tend to be large at low frequencies and small at high frequencies. The problem (14) has the form of a so-called Second Order Cone Program (SOCP) problem, which can be solved efficiently using available solvers, see e.g. S. Yan, C. Hou and X. Ma (ibid.).

One issue related to the present embodiment is the definition and calculation of the co-variance matrix R. Ideally it should be calculated using the sensor signals to be used for the beamforming, implying that the optimization problem (14) would have to be solved for every focus point $r_0$ of each new measurement. This is a fairly heavy task. As an example, with 50 transducers and 64 FIR filter tabs, 3.200 variables in the vector h have to be determined for each focus point. To avoid this, embodiments of the method described herein using a filter bank of pre-calculated filters in combination with spatial interpolation may be used. But then the co-variance matrix would have to be some assumed average for the intended applications. Typically a diagonal matrix with identical elements on the diagonal may be used, implying that the minimization of $\|U^*h\|_2$ could be replaced by a minimization of $\|h\|_2$, which means just a minimization of the WNG. Then the last constraint—the WNG constraint—may be removed.

However, a main issue is the use of relatively few assumed positions r, of disturbing sources. Although on average the sensitivity to disturbing sources at other positions will be minimized as described above, there may by high sidelobe (sensitivity) peaks between the points r, at some frequencies. A related issue is the selection of the allowed maximum relative sidelobe level $\epsilon$. In principle one may not know, which sidelobe level can be achieved across the selected frequencies $\omega_k$ in the presence of the other constraints. This would require some investigation related to a given array and given focus points.

The following alternative embodiment addresses these issues by skipping the minimization of $\|h\|_2$ and by doing instead a minimization of the maximum sidelobe level $\epsilon$. In particular, based on the above discussion, the following optimization problem may be defined to determine the FIR filter coefficients:

$$\underset{h,\varepsilon}{\text{Minimize}} \; \varepsilon \quad (15)$$

subject to $$|u^T(\omega_k, r_0)h| = 1,$$

$$k = 1, 2, \ldots, K$$

$$|u^T(\omega_k, r_{k,i})h| \leq \varepsilon,$$

-continued $$k = 1, 2, \ldots, K,$$

$$i = 1, 2, \ldots, I_k$$

$$\|h\| \leq \Delta$$

This is also a SOCP problem, which can therefore be solved efficiently using available solvers. The WNG can still be controlled through the last constraint, providing some level of "average control" on the level of sidelobes between the positions $r_{k,i}$. But otherwise the idea is to use a grid of points $r_{k,i}$ that is sufficiently dense to control to some degree of accuracy all sidelobes within a desired range and thus to minimize the highest sidelobe.

A major issue is here the size of the optimization problem (15), as may be illustrated by the following example.

Example

In one example an array of M=50 microphones flush mounted in a rigid spherical surface of radius a=10 cm is used. The average spacing between the microphones is then close to 5 cm, which is well below half a wavelength up to approximately 2.5 kHz. In that frequency range low sidelobe levels can be achieved with well-chosen distributions of the 50 microphones on the sphere. $F_{max}$=2.5 kHz is therefore chosen to be the upper limiting frequency in this example.

At 2.5 kHz we have ka≡ωa/c≈4.58, k being here the wave number and c the propagation speed of sound. Spherical harmonics of degree up to around that number N≈ka will be naturally dominating in the directivity patterns of the spherical array (see M. Park and B. Rafaely, "Sound-field analysis by plane-wave decomposition using spherical microphone array", J. Acoust. Soc. Am. 118 (5), November 2005, 2005, 3094-3103.) However, allowing a reasonable level of WNG, i.e. a reasonable norm of the solution vector h, spherical harmonics of degree up to around N≈Minimum{ka+2.6} will be amplified to be approximately on the same level during the optimization. The smallest peak-to-zero angular radius of a lobe is then $\theta_r$≈π/N, see M. Park and B. Rafaely (ibid.). In order not to miss sidelobe peaks by too much, it has been found that the angular spacing $\Delta\theta$ in grid $r_{k,i}$ should not exceed approximately 20% of the smallest lobe angular radius $\theta_r$. Choosing a grid with angular spacing $\Delta\theta$=0.2π/N that covers the full 4π-solid angle requires a number of points around:

$$I \approx \frac{2}{1 - \cos(\Delta\theta)} \quad (16)$$

At 2.5 kHz this leads to I≈365 points. But out of these we have to remove the points that lie in the area of the mainlobe, amounting for approximately 50 points, so we end up with 315 points.

Using a sampling frequency equal to 16,384 samples/second, according to experience typically a FIR filter length L=128 is normally needed, if low-frequency resolution somewhat better than that of Delay And Sum is to be modelled. The time span of the filter is then close to the time it takes a wave to encircle the sphere 4 times. In order to determine the L FIR filter coefficients, a number K of frequencies $\omega_k$ at least equal to L/2 should be used. The division by 2 is due to the fact that each frequency provides effectively a constraint on a complex response with both a real and an imaginary part. However, a certain over-determination was found to be useful, so finally K≈0.7·L≈90 was chosen. Distributing 90 frequencies equally over the frequency interval from 0 Hz to 2.5 kHz, and using the above scheme to calculate the number $I_k$ of constraint positions $r_{k,i}$ at each frequency, one ends up with a total number of points $r_{k,i}$ around 13,600. Beyond these approximately 13,600 inequality constraints in (15), we have one more inequality constraint plus K=90 equality constraints. The number of variable FIR filter coefficients in h (to be determined in the solution process) is as mentioned previously: ML=50·128=6400. Already this is not well suited for being done during every beamforming processing.

But beamforming is in practice often used up to around a factor 3 times the "frequency-of-half-wavelength-spatial-sampling", in the present case up to 7.5 kHz. Doing this will require doubling the temporal sampling frequency, i.e. up to 32,768 Samples/second, which again requires doubling the number L of FIR filter tabs in order to maintain the filter length in seconds. And following the previously used criterion for selection of the frequency number count K, that count must be doubled as well, so we end up with: L=256, K=180, and a number of variable FIR coefficients equal to 12,800. The largest increase of the problem size comes, however, from the need for a very dense grid $r_{k,i}$ at the added frequencies between 2.5 and 7.5 kHz. The following increase of maximum spherical harmonics degree N with frequency has been found to work well:

$$N \approx \begin{cases} ka+2 & ka \leq 4 \\ 6 & 4 < ka < 6 \\ ka & ka \geq 6. \end{cases} \quad (17)$$

With K=180 frequencies uniformly distributed between 0 Hz to 7.5 kHz, and using the previously used scheme for calculation the density in the $r_{k,i}$ grids, we end up with a total of around 116,000 inequality constraints. Considering the matrix of gradients of the constraint functions, it will have 12,800×116,000=1,484,800,000 elements, taking 6 GB of memory in Floating Point representation. This problem size is not considered tractable for every focus point in a beamforming calculation in reasonable time.

The conclusion from the above example is that the second embodiment can be used for problems, which are relatively small in terms of transducer count, array diameter and/or upper limiting frequency. For practical application of for example a 20 cm-diameter, 50-element spherical array the method is not feasible. It could perhaps be handled by a powerful computer for a one-time generation of a filter bank to be used according to the embodiments of the method disclosed herein.

The following third embodiment avoids the need for large computing power for pre-computing the optimised filter parameters. Beyond that it also solves the problem that very different levels of sidelobe suppression can be achieved below and above the "frequency-of-half-wavelength-spatial-sampling". The second alternative embodiment described above may not always be able to properly handle that because the same value of ε is used at all frequencies. One could make an attempt to define a frequency-varying ε, but knowing if a "good variation" has been defined would be difficult.

According to the third embodiment, in the expression (12) for the contribution to the beamformer output from source #1 we use the definition (5) of the frequency domain representation of the FIR filters $H_m(\omega)$ (again, for the purpose of the present description, we have skipped the index n, looking only at a single focus point) to obtain:

$$B_i(\omega) = S_i(\omega) \sum_m G_{i,m}(\omega) e^{-j\omega v_m T_{SF}} H_m(\omega). \quad (18)$$

Corresponding to the definition of the vector u in (13), the column vector v is now defined as:

$$v(\omega, r_i) \equiv \{G_{i,m}(\omega) e^{-j\omega v_m T_{SF}}\}_{m=1,2,\ldots,M}. \quad (19)$$

Just like in the first and second embodiments, the third embodiment comprises optimizing the performance of the FIR beamformer at a discrete set of frequencies $\omega_k$, k=1, 2, ..., K. To facilitate a matrix-vector description of the present embodiment, the matrix H of FIR filter responses at these discrete frequencies is defined in the following way:

$$H \equiv \{H_{k,m}\} \equiv \begin{pmatrix} H_{1,1} & H_{1,2} & \cdots & H_{1,M} \\ H_{2,1} & H_{2,2} & & H_{2,M} \\ \vdots & & \ddots & \vdots \\ H_{K,1} & H_{K,2} & & H_{K,M} \end{pmatrix} \equiv \quad (20)$$

$$\begin{Bmatrix} H_1(\omega_1) & H_2(\omega_1) & \cdots & H_M(\omega_1) \\ H_1(\omega_2) & H_2(\omega_2) & & H_M(\omega_2) \\ \vdots & & \ddots & \vdots \\ H_1(\omega_K) & H_2(\omega_K) & & H_M(\omega_K) \end{Bmatrix},$$

And $H_m$ and $H_k$ are used to represent column vectors containing the elements of column m and row k, respectively, in H. Using these definitions, the expression (18) for the single source contributions to the beamformer output at frequencies $\omega_k$ can be expressed as:

$$B_i(\omega_k) = S_i(\omega_k) v^T(\omega_k, r_i) H_k. \quad (21)$$

Clearly, if source #i should be correctly reconstructed in the beamformer output, then the value of $v^T(\omega_k, r_i) H_k$ should equal one at all frequencies. If its contribution should be avoided, then $|v^T(\omega_k, r_i) H_k|$ should be as small as possible at all frequencies.

The third embodiment of the method generally optimizes the FIR filters through the following 2-step procedure:
1) Taking the frequencies $\omega_k$, k=1, 2, ..., K one at a time, calculate the set of complex transducer weights in $H_k$ as the solution to the problem:

$$\begin{array}{c} \text{Minimize } \varepsilon_k \\ H_k, \varepsilon_k \end{array} \quad (22)$$

subject to $$v^T(\omega_k, r_0) H_k = 1,$$

$$|v^T(\omega_k, r_{k,i}) H_k| \leq \varepsilon_k,$$

$$i = 1, 2, \ldots, I_k$$

$$\|H_k - H_k^{(0)}\| \leq \Delta$$

Upon completion, a full matrix H is available. The selection of $H_k^{(0)}$ will be explained below.
2) For each transducer m, fit a FIR filter with tabs $$h_m \equiv \{h_{m,l}\}_{l=0,1,\ldots,L-1}$$

to the frequency response vector $H_m$. To do that, equation (5) is applied at frequencies $\omega_k$, skipping again the focus point index n, because we consider here only a single point (#0):

$$H_m = A h_m. \quad (23)$$

Here, A is the following matrix with K rows (frequencies) and L columns (filter tabs):

$$A \equiv \{e^{-j\omega_k lT_{SF}}\} \equiv \begin{pmatrix} 1 & e^{-j\omega_1 T_{SF}} & \cdots & e^{-j\omega_1 (L-1)T_{SF}} \\ 1 & e^{-j\omega_2 T_{SF}} & & e^{-j\omega_2 (L-1)T_{SF}} \\ \vdots & & \ddots & \vdots \\ 1 & e^{-j\omega_K T_{SF}} & & e^{-j\omega_K (L-1)T_{SF}} \end{pmatrix}. \quad (24)$$

Equation (23) is solved in a regularized least-squares sense.

Notice that the equality constraint in the problem (22) includes the phase as opposed to equality constraints in the problem (14). This is because a consistent "smooth" phase of $H_m(\omega_k)$ is needed across the frequencies a to obtain a useful solution $h_m$ from equation (23) in the second step.

It has, perhaps surprisingly, turned out that such a smooth frequency variation of the phase indeed results from step 1) above when $H_k^{(0)}$ in eqn. (22) is selected suitably. The problem (22) is an SOCP problem that is solved using an iterative optimization procedure. Instead of using $H_k$ with all zeroes as starting point, the inventors used a well-conditioned analytical starting vector $H_k^{(0)}$ which fulfils the equality constraint in (22). Typically this will be a Delay And Sum solution for a "transparent" array and a Spherical Harmonics Beamforming solution for the case of an array of transducers in a (e.g. so-called flush-mounted) rigid sphere. In one successful implementation, a steepest descent algorithm was used, starting at $H_k^{(0)}$, and the iteration was stopped where that path crossed the hyper-sphere $\|H_k - H_k^{(0)}\| = \Delta$, or when the gradient norm became smaller than for example 1% of its value at $H_k^{(0)}$. A typical value of $\Delta$ would be $\Delta = \|H_k^{(0)}\|$. Use of that procedure turned out to produce frequency response functions $H_m$ that could be very easily represented by the rather short FIR filters $h_m$.

With suitably chosen frequencies $\omega_k$ the relation (23) expresses just an FFT relationship between $H_m$ and $h_m$. Choosing the frequencies that way will, however, not support over-determination. And in any case, the solution of (23) in step 2) is a much smaller (much less time consuming) computational task than the optimization problem in step 1).

The largest computational problem is the solution of (22) at the highest frequency. For the 50-element spherical array example discussed in connection with the second embodiment above, each one of the 180 frequencies involves solution of (22) with M=50 complex variables, and at 7.5 kHz the number of inequality constraints will be approximately 1862. This is a problem of tractable size. But recalling that 180 frequencies must be handled, and that this has to be done for every focus point, it is still a computational problem not suited for being done in connection with every beamforming calculation. For practical applications in connection with the type of array used in the example, a filter bank as described herein is a considerable advantage.

As mentioned above, the spacing between the points $r_n$ covered in the filter bank should be somewhat smaller than the local beamwidth of the beamformer. For the 50-element spherical array of the above example an angular mesh with approximately 5° spacing, plus only 3 radial distances beyond 25 cm from the sphere, was found to be applicable for linear interpolation in angle (2D) and in radial distance. For the radial interpolation it was found to be better to assume linear variation as a function of inverse distance than as a function of distance.

The method and apparatus described herein may be used to identify a variety of sound/noise sources such as vibrating objects, e.g. when analysing acoustic properties of machines, motors, engines, vehicles such as cars, and/or the like.

Embodiments of the method described herein can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A method of determining a focused output signal of a sensor array comprising a plurality of sensors, each sensor being operable to output a sensor output signal responsive to a measured quantity, the focused output signal being indicative of a calculated quantity at a focus point; the method comprising:
    receiving a respective measured sensor output signal from each of the sensors;
    computing the focused output signal by performing a focusing calculation with respect to the measured sensor signals;
    wherein the method further comprises determining a subset of mesh points of a set of predetermined mesh points, each mesh point having at least one pre-computed filter parameter associated with it; wherein the determining the subset of mesh points comprises selecting mesh points in a proximity of the focus point;
    and wherein computing the focused output signal comprises performing an interpolation with respect to the subset of mesh points so as to obtain an interpolated focused output signal.

2. A method according to claim 1, wherein the focused output signal is indicative of a combination of a plurality of filtered sensor signals, each filtered sensor signal being indicative of a respective one of the measured sensor signals filtered by a filter associated with the corresponding sensor from which the respective measured sensor signal has been received, the filter being dependent on at least one filter parameter dependent on the focus point.

3. A method according to claim 1, wherein computing the interpolated focused output signal comprises applying one or more auxiliary filters to each of the respective measured sensor output signals; each of the one or more auxiliary filters being associated with the corresponding sensor from which the respective measured sensor signal has been received, and each of the one or more auxiliary filters being dependent on at least one of the pre-computed filter parameters.

4. A method according to claim 1, wherein the interpolation is a linear interpolation.

5. A method according to claim 1, wherein the interpolation includes an interpolation in angle coordinates.

6. A method according to claim 1, wherein computing the focused output signal comprises:

for each sensor, computing a plurality of auxiliary filtered sensor signals by applying respective auxiliary filters to the measured sensor output signal, each auxiliary filter being associated with the corresponding sensor from which the measured sensor signal has been received, and each auxiliary filter being dependent on at least one of the pre-computed filter parameters;

combining, for each mesh point, the plurality of auxiliary filtered sensor signals computed for respective sensors to obtain an auxiliary focused output signal, and interpolating the auxiliary focused output signals computed for respective mesh points to obtain said interpolated focused output signal.

7. A method according to claim 1, wherein computing the focused output signal comprises:

for each sensor, computing a plurality of auxiliary filtered sensor signals by applying respective auxiliary filters to the measured sensor output signal, each auxiliary filter being associated with the corresponding sensor from which the measured sensor signal has been received, and each auxiliary filter being dependent on at least one of the pre-computed filter parameters;

interpolating, for each sensor, the plurality of auxiliary filtered sensor signals computed for respective mesh points to obtain an interpolated filtered sensor signal, and combining the interpolated sensor signals computed for respective sensors to obtain said interpolated focused output signal.

8. A method according to claim 6, comprising determining respective subsets of mesh points for a plurality of focus points; and calculating respective auxiliary filtered sensor signals for the mesh points of all determined subsets.

9. A method according to claim 1, wherein computing the focused output signal comprises:

computing, for each sensor, at least one interpolated filter parameter from said pre-computed filter parameters associated with respective ones of the determined subset of mesh points;

computing, for each sensor, an interpolated filtered sensor signal by applying the respective interpolated filter to the measured sensor output signal; and combining the interpolated filtered sensor signals computed for respective sensors to obtain the interpolated focused output signal.

10. A method according to claim 1, wherein each pre-computed filter parameter associated with a first mesh point is computed by minimising a maximum sidelobe level, the maximum sidelobe level being indicative of a level of suppression of disturbances from a set of other positions different from the first mesh point and at a set of predetermined frequencies.

11. A method according to claim 1, wherein each pre-computed filter parameter associated with a first mesh point is computed by determining, for each of a set of predetermined frequencies, a set of sensor weights by minimising a maximum sidelobe level, the maximum sidelobe level being indicative of a level of suppression of disturbances from a set of other positions different from the first mesh point and at said frequency, each sensor weight being associated with a respective one of the sensors;

determining, for each sensor, at least one pre-computed filter parameter by fitting a frequency response defined by said pre-computed filter parameter to a frequency response vector composed of a subset of said determined sensor weights, the sensor weights of said subset being associated with respective frequencies.

12. A method according to claim 1, wherein the mesh points are arranged with a distance between neighbouring mesh points smaller than a local beamwidth of a beamformer.

13. A method according to claim 1, wherein the focusing calculation is a filter-and-sum calculation.

14. A processing apparatus for performing array focusing, the processing apparatus comprising an interface for receiving, from respective sensors of a sensor array, a set of sensor output signals responsive to a measured quantity; and a processing unit configured to perform the steps of the method defined in claim 1, wherein the processing unit comprises a storage medium for storing said set of pre-computed filter parameters.

15. An acoustic processing system comprising a processing apparatus as defined in claim 14, and a set of sensors for measuring a measured quantity at a set of measurement locations, and connectable in communication connection to the apparatus so as to forward the measured first acoustic quantity to the processing apparatus.

16. Computer program on a non-transitory, computer-readable medium comprising program code means adapted to cause a data processing system to perform the steps of the method according to claim 1, when the program code means are executed on the data processing system.

17. A computer-readable medium having stored thereon a set of pre-computed filter parameters each associated with one of a set of mesh points and each for use by a processing apparatus as defined in claim 14 when performing the steps of the method defined in claim 1.

* * * * *